US012103309B2

(12) United States Patent
Zapata et al.

(10) Patent No.: US 12,103,309 B2

(45) Date of Patent: Oct. 1, 2024

(54) VACUUM-ASSISTED PRINTING FOR POROUS SUBSTRATES

(71) Applicant: Hewlett-Packard Development Company, L.P., Spring, TX (US)

(72) Inventors: Maria Elizabeth Zapata, Sant Cugat del Valles (ES); Raimon Castells de Monet, Sant Cugat del Valles (ES); Francisco Lopez Moral, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 115 days.

(21) Appl. No.: 17/905,725

(22) PCT Filed: Mar. 11, 2020

(86) PCT No.: PCT/US2020/022077

§ 371 (c)(1),
(2) Date: Sep. 6, 2022

(87) PCT Pub. No.: WO2021/183123

PCT Pub. Date: Sep. 16, 2021

(65) Prior Publication Data

US 2023/0104762 A1 Apr. 6, 2023

(51) Int. Cl.
*B41J 2/165* (2006.01)

(52) U.S. Cl.
CPC .................................. *B41J 2/1652* (2013.01)

(58) Field of Classification Search
CPC ........ B41J 2/1652; B41J 2/175; B41J 3/4078; B41J 15/04; B41J 29/02; B41J 29/38; B41J 11/0085
See application file for complete search history.

(56) References Cited

U.S. PATENT DOCUMENTS

| | | | |
|---|---|---|---|
| 5,938,187 A | 8/1999 | Conlan et al. | |
| 6,022,104 A | 2/2000 | Lin et al. | |
| 6,467,410 B1 * | 10/2002 | Rasmussen .......... | B41J 11/0085 358/1.12 |
| 2017/0043598 A1 * | 2/2017 | Sanaei ..................... | B41J 11/08 |
| 2018/0326757 A1 | 11/2018 | Bouwens et al. | |
| 2018/0327967 A1 | 11/2018 | Rees et al. | |

FOREIGN PATENT DOCUMENTS

| | | |
|---|---|---|
| CN | 102092190 A | 6/2011 |
| KR | 10-2018-0063620 A | 6/2018 |
| WO | 2016/150507 A1 | 9/2016 |
| WO | 2018/114303 A1 | 6/2018 |

* cited by examiner

*Primary Examiner* — Thinh H Nguyen
(74) *Attorney, Agent, or Firm* — Jordan IP Law, LLC

(57) ABSTRACT

It is hereby disclosed a method to print on porous substrate by a printer comprising: a print zone; a conveyor to receive a porous substrate on a loading zone and to move the porous substrate along a transport direction between the print zone and the loading zone; a print engine positioned on the print zone for ejecting printing fluid towards the porous substrate; wherein the method comprises ejecting printing fluid towards a front side the porous substrate and, by a controller, activating a vacuum source as to exert a vacuum on a back side of the porous substrate being the vacuum exerted while the porous substrate is within the print zone.

13 Claims, 4 Drawing Sheets

VACUUM-ASSISTED PRINTING FOR POROUS SUBSTRATES

BACKGROUND

Printing on porous substrates, e.g., textile printing is a growing field of technology wherein standard printers have a lower efficiency due to the particularities of such porous materials. Such particularities add further complexity to a printing system in case the user intends to print (i.e., deposit a printing fluid) directly onto a garment given the added complexity of dealing with different sizes, shapes, and materials of such garments.

In an example, direct-to-garment (DTG) printing systems are to be provided in shops or small to medium businesses that have space constrains, therefore, a compact system and with modularity capabilities may be advantageous.

BRIEF DESCRIPTION OF THE DRAWINGS

Various example features will be apparent from the detailed description which follows, taken in conjunction with the accompanying drawings, wherein.

DETAILED DESCRIPTION

Figure 1A:
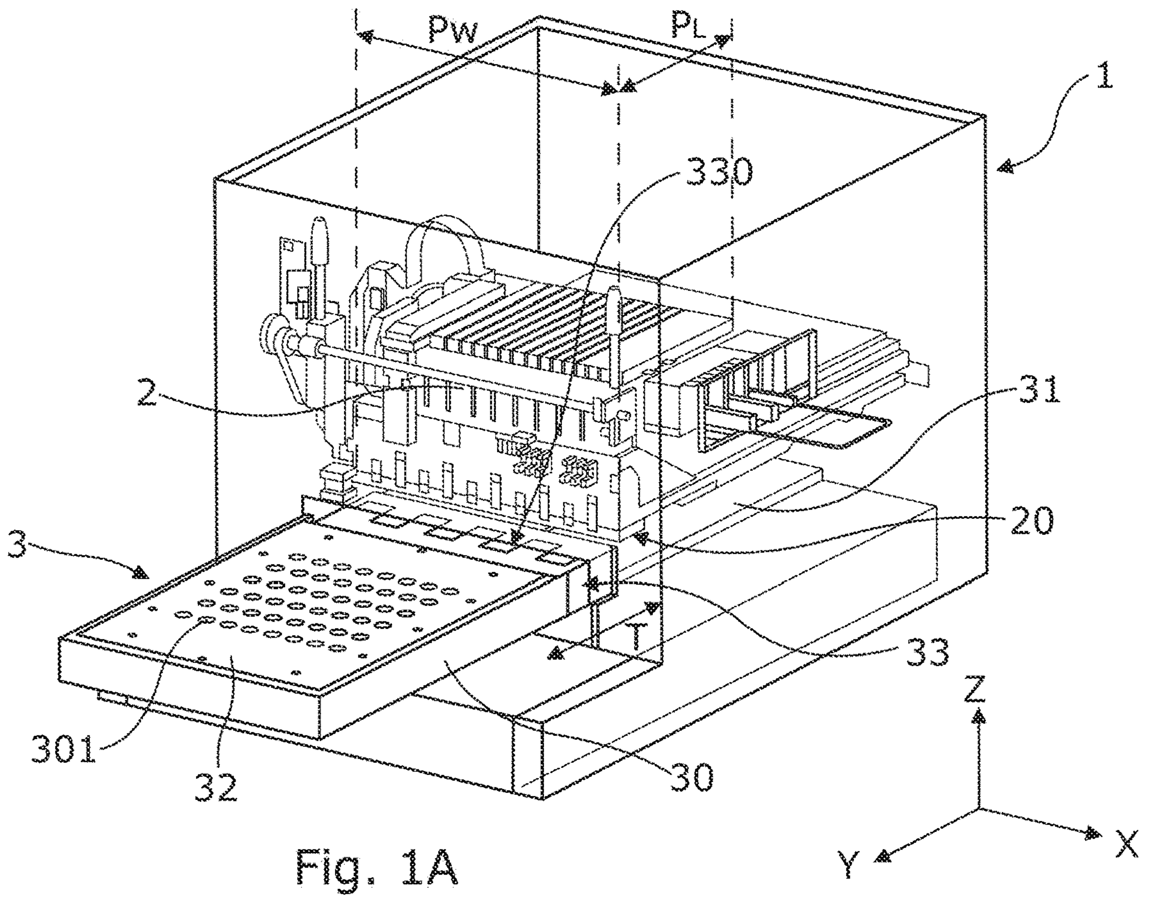
FIG. 1A is a perspective view of an example of direct-to-garment printer.

In the following description and figures, some example implementations of print apparatus, print systems, and/or printers are described. In examples described herein, a "printer" or a "printing system" may be a device to print content on a physical medium (e.g., textiles) with a print material (e.g., ink or toner). For example, the printer may be a wide-format print apparatus that prints latex-based print fluid on a print medium, such as a print medium that is size A2 or larger. The physical medium printed on may be a garment such as, e.g., a shirt, a cap or the like.

Moreover, a page-wide-array ("PWA") printing system is a printing system comprising a printhead that spans an entire printing area and may include thousands of nozzles. The PWA printhead thus has many more nozzles than the scanning-type printheads discussed above. The PWA printhead is formed on an elongated printbar. The printbar typically is oriented orthogonally to the print medium path. During operation, the printbar and PWA printhead are fixed while a print medium is fed adjacent to the printhead. The PWA printhead prints one or more lines at a time as the print medium moves relative to the printhead. This compares to the printing of multiple characters at a time as achieved by scanning-type printheads.

The present disclosure relates to a method to print on porous substrate by a printer comprising:

- a print zone;
- a conveyor to receive a porous substrate on a loading zone and to move the porous substrate along a transport direction between the print zone and the loading zone;

- a print engine positioned on the print zone for ejecting printing fluid towards the porous substrate;

the method comprises ejecting printing fluid towards a front side the porous substrate and, by a controller, activating a vacuum source as to exert a vacuum on a back side of the porous substrate being the vacuum exerted while the porous substrate is within the print zone In an example, the conveyor is independent from the vacuum source, that is, their control is not related to one another. For example, a controller may have algorithms to control the vacuum source that are not related to the conveying operation, e.g., using as control variables the fluid ejection or time but its operation is not related to moving media across a media path.

In another example, the conveyor comprises a tray to reciprocate along the transport direction being the porous substrate fixed to the tray.

Also, the tray may, in an example, comprise a fluid conduct as to allow vacuum to pass through the tray towards the porous substrate. Moreover, the tray may also comprise a clamping mechanism to fix the porous substrate to the tray.

In an example, the controller activates the vacuum source and such activation may be performed by using one of: pulse-width modulation or on-off control. The controller may be configured to deactivate the vacuum source if: the porous substrate is substantially away from the print zone and/or printing fluid is not being ejected towards the porous substrate thereby being control methods independent from the media conveying.

The printer wherein the above-mentioned methods are implemented may comprise, e.g., a page-wide array of nozzles to eject the printing fluid towards the porous substrate. In other examples, the printhead may be of a scanning type, i.e., that reciprocates along a swath direction ejecting printing fluid.

It is also hereby disclosed a porous substrate printer that comprises

- a plurality of nozzles to eject printing fluid along the width of print zone;
- a conveyor to move a porous substrate below the nozzles in a transport direction perpendicular to the width of the print zone; and
- a vacuum source associated to a controller and being to exert a vacuum below the substrate in an area spanning the print zone;

wherein during a printing operation, the controller is to activate the vacuum source thereby increasing the absorption of the printing fluid by the porous substrate.

In an example, the printer comprises a filter between the vacuum source and the substrate. The filter may be any type of liquid/gas separator such as, for example, a foam that absorbs liquid but allows the passage of air therethrough.

In another example, the conveyor comprises a tray to reciprocate along the transport direction being the porous substrate fixed to the tray during a printing operation.

Furthermore, the length of the print zone is, at most, half of the width of the print zone.

The present disclosure also refers to a non-transitory machine readable medium storing instructions executable by a controller, the medium storing instructions to control a printer with the above referenced methods.

FIG. 1A shows an example of a printer 1, in this case, a page-wide array printer 1 and may be, for example, an inkjet printer to print directly onto a porous substrate such as a garment, i.e., a direct-to-garment inkjet printer. Inkjet printers are, in general terms, controllable fluid ejection devices that propel droplets of printing fluid from a nozzle to form an image on a substrate (e.g., a garment) wherein such propelling can be achieved by different technologies such as, e.g., thermal injection or piezo injection. The printing fluid is normally ejected by a so-called print engine that includes a plurality of nozzles, in the case of page-wide array printers, the print engine includes a printbar with nozzles that span the entirety of the width of the print zone.

The printer 1 comprises a printbar having a plurality of nozzles, for example, two rows of nozzles which may be for example, staggered or offset from one another. The nozzles are arranged to fire ink drops onto a garment as the garment is advanced through the printer apparatus in a transport direction indicated by arrow T (also referred to hereinafter as the "media advance direction", also known as the media axis). The printer 1 comprises a controller for controlling the operation of the printer apparatus. The direction substantially perpendicular to the media advance direction will be referred to hereinafter as the "print zone width direction" and is also known as the pen direction, pen axis, print bar longitudinal direction or print-head direction.

In an example, the printer 1 may be provided with a plurality of printheads provided on the printbar. The printheads may be arranged so that their nozzles at least partially overlap in the media advance direction. Each printhead comprises nozzles that may be arranged, e.g., in two rows, with each row of nozzles being spaced by a distance, for example 21.167 microns (one twelve-hundredth of an inch) and the nozzles in the two rows may be mutually staggered by a staggering distance, so that the successive nozzles in each die are spaced, for example, by 21.167 microns (one twelve-hundredth of an inch), 1 micron being equal to 1 micrometer or $10^{-6}$ meters. It is noted that these dimensions are provided for illustrative purposes only.

FIG. 1A shows as printer 1 comprising a print engine 2 with a printbar 20 installed therein, the printbar extends along a widthwise direction (X axis) thereby defining the width of the print zone ($P_W$) of the printer. Also, the print engine 2 may comprise or be connected to a controller that controls the action of the print engine 2, including, defining the nozzle firing frequency of each of the nozzles within the printbar 20.

The print engine 2 may comprise a plurality of printbars 20, for example, a plurality of printbars along the media advance direction (T) or a plurality of printbars 20 extending in the widthwise direction. In any case the maximum distance between the nozzles of the printbars defines in a widthwise direction (a direction perpendicular to the media advance direction (T)) defines the width of the print zone ($P_w$). Also, the amount of printbars may define the size of the print engine 2 and, in turn, defines the length of the print zone ($P_L$).

In an example, the print zone is defined as the zone wherein printing fluid may arrive at the substrate. In some examples, the print zone also includes adjacent tolerance areas of around 20% of the zone wherein printing fluid may arrive at the substrate, i.e., a zone substantially spanning the size of the print engine with a 20% increase on its length and/or width.

Furthermore, FIG. 1A shows a conveyor 3 to move a garment from a loading zone towards the print engine 2, i.e., towards the printing zone as defined by the print zone length ($P_L$) and the print zone width ($P_W$). The conveyor 3 may be, for example, a tray 32 that may comprise a frame 30 and may be slidingly attached to a base 31 thereby providing a linear movement of a part of the conveyor 3 (for example, the tray 32) along a media path direction (T).

The conveyor 3 may comprise means to fix a garment thereto, in an example, the fixing means may be a clamping mechanism such as a frame that is attached to the tray 32 by a hinged connection or similar pivotable connection so as to pivot between an open and a closed position. In the open position, the user may locate a garment over the tray and close the frame as to clamp the garment thereby fixing it to the tray.

In use, the user loads a garment by providing it to the conveyor 3, the conveyor may comprise holding means for maintaining the garment fixed relative to part of the conveyor 3, in particular, the tray 32 and, subsequently, the conveyor 3 is to linearly move the garment along the media advance direction (T) towards the print zone.

The conveyor 3 moves the garment between a loading zone and the print zone along a media path direction (T), once the garment reaches the print zone it moves at a substantially constant speed through the print zone while the nozzles of the printbar 20 deposit printing fluid onto the garment. In a page-wide array configuration, since all of the width ($P_w$) of the print zone is provided with nozzles, the printbars 20 and, in consequence, the nozzles are maintained in a static position during a printing operation and it is the conveyor 3 the part of the printer that is to be in movement.

The page-wide array configuration of the example of FIG. 1 provides for a more compact design given that the print engine 2 can be design as to span substantially the print zone allowing for a printer 1 that occupies less space while maintaining the same width of print zone ($P_w$) when compared, e.g., to scanning printhead printers in which the printer requires start and stop areas at both sides of the print zone. In any case, scanning printhead type of printers may also be used in the present invention.

One aspect that is considered while printing in porous substrates is that the penetration of the printing fluid into the substrate is of importance, e.g., to improve washfastness of the substrate and/or allow for a printed image to be seen in both sides of the substrate. This is of even more importance in cases in which the porous substrate may have been subject to chemical processes that affect its permeability before the printing operation.

Figure 1B:
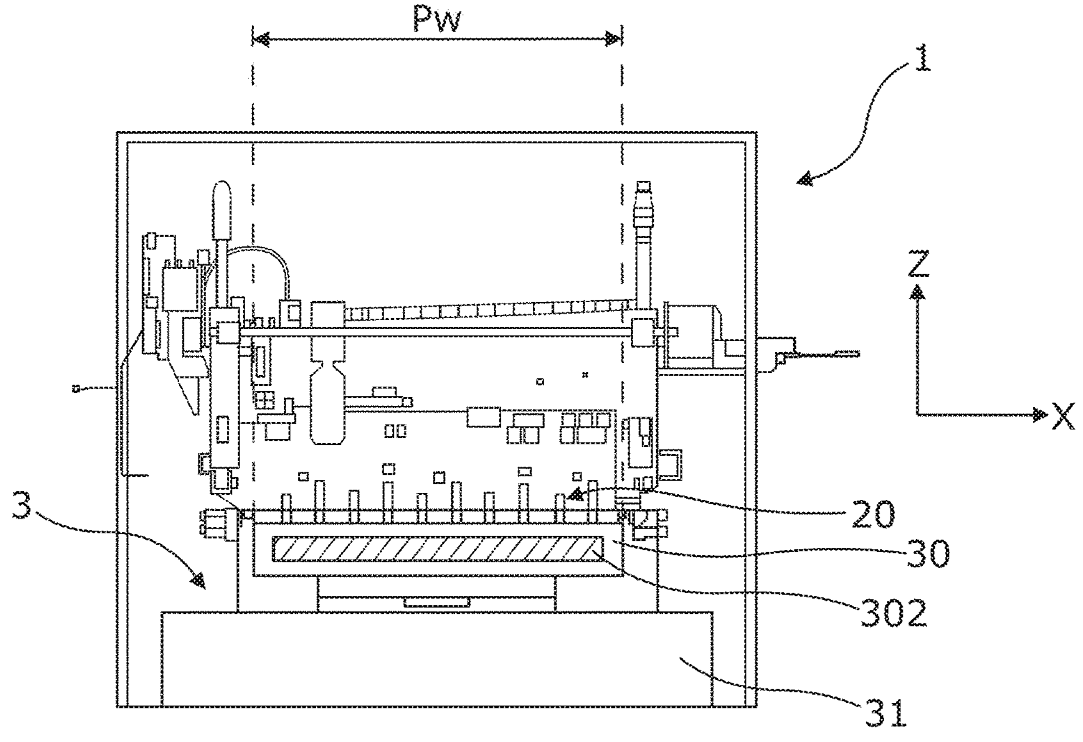
FIG. 1B is a front view of an example of direct-to-garment printer.

To improve such printing fluid penetration, the printer of FIGS. 1A, 1B comprise a vacuum pump to exert a vacuum on the porous substrate, in particular, on the side of the substrate opposite to the side receiving printing fluid from the printheads 20 thereby increasing the penetration rate of the printing fluid through the porous substrate.

In the example, of FIGS. 1A and 1B, the printer may comprise a vacuum chamber 302 below the conveyor 3. The conveyor may also comprise a fluid communication means to allow vacuum through the conveyor, e.g., a plurality of holes 301 within the tray 32. In use, a controller may instruct the printer to move the porous substrate towards the print zone, once in the print zone, the print engine may eject printing fluid towards the porous substrate and, subsequently, a controller may instruct a vacuum pump to exert a vacuum on the garment as to increase the penetration of the printing fluid through the porous substrate. Such vacuum is normally applied while the porous substrate is still substantially in the print zone as to allow that a significant amount of printing fluid penetrates the porous substrate before drying.

In a further example, the vacuum chamber 302 may comprise a filter positioned between the vacuum pump and the garment, the filter being to prevent printing fluid to reach the vacuum pump. Examples of filters may include any type of gas-liquid filters, i.e., that prevent liquid but allow gas to air to pass through such as, foams, absorbent fabrics, microfibers, etc.

A mechanism to prevent nozzle clogging may be providing a spittoon 33 to the printer 1. The spittoon 33 allows for spitting of nozzles onto a spitting surface 330 that may have the capability to absorb waste ink. In an example, the spitting surface is a foam collecting spittoon, such spittoon is passive and potentially user replaceable after a certain amount of ink has been deposited. In a further example, the spitting surface comprises a suction, filtering, or collection system, e.g., by a system able to collect waste ink into an offline container. In an example implementation the conveyor 3 comprises a spittoon 33 attached thereto so that the conveyor 3 may be positioned along the media path direction (T) in a spitting location in which the nozzles eject printing fluid towards the spittoon 33.

In an example, the spittoon may be a page-wide spittoon or, in other words, a spittoon that has a dimension such that it covers at least the width of the print zone ($P_w$). In a further example, the spittoon may be a scanning spittoon that moves along the width of the print zone ($P_w$) in a scanning movement. In any case, the spittoon may be preferably attached to the carriage 3, either to the base 31 or the tray 32.

Figure 2:
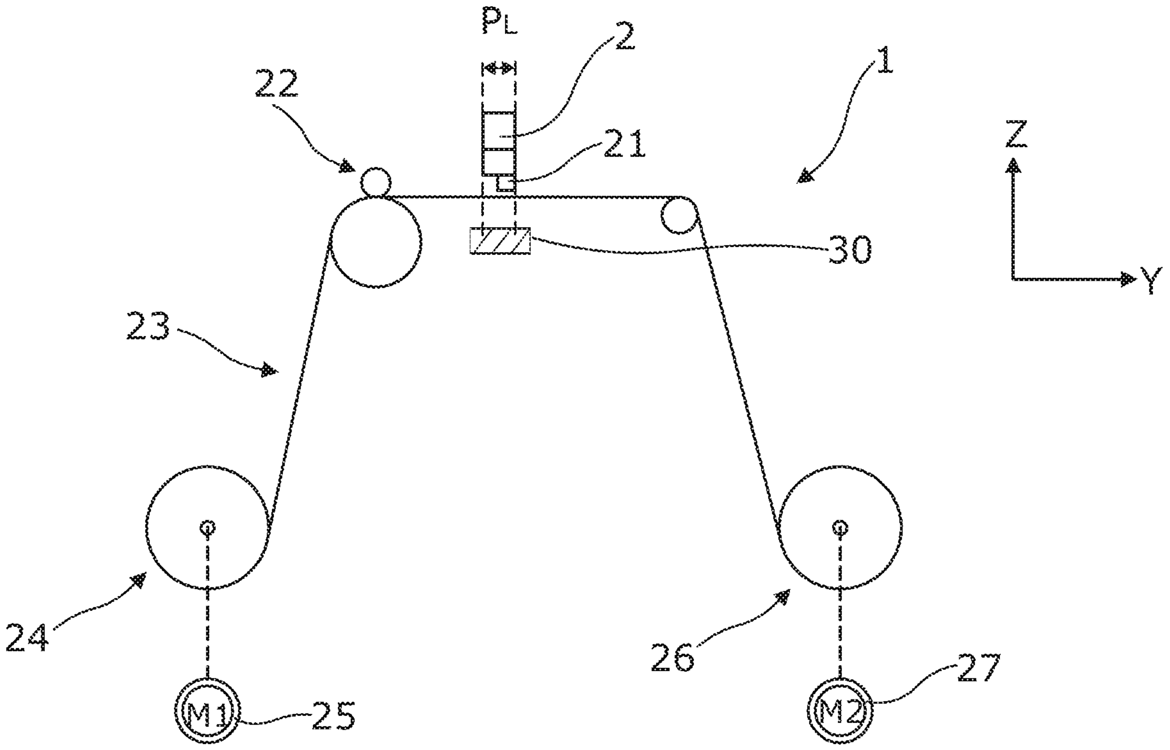
FIG. 2 shows a side view of an example of roll-to-roll printer according to an example.

FIG. 1B is front view of the printer 1 of FIG. 1. FIG. 2 shows another view of the conveyor that comprises a base 31 and a tray 30 wherein the tray is to slide along the length of the base therefore moving the garment between a position away from the print zone and the print zone, for example, between a loading zone and a print zone or between a print zone and a post-processing zone opposite to the loading zone.

FIG. 2 shows a further example wherein a printer 1 is to print onto rolls of porous substrate 23 instead of the garment of FIGS. 1A and 1B. In such an example the printer may be a scanning printer (wherein the print engine 2 comprises a carriage that reciprocates printheads 21 along the print zone width depositing printing fluid) or a page-wide array printer (wherein the print engine 2 comprises printheads 21 that span the print zone width and that are static during a printing operation).

In the example of FIG. 2, the printer 1 is to receive an input roll 24 comprising porous substrate 24, e.g., a textile and by conveyors passing the porous substrate 24 along a media path towards a print zone with a determined print zone length ($P_L$) as to print it and, then, storing the printed porous substrate in an output roll 26 but alternatively the porous substrate may be left unwound in a sheet format, e.g., to be cut by an operator or a post-processing station.

In the example provided in FIG. 2, the conveying mechanism comprises a motor $M_1$ 25, a motor $M_2$ 27 and a plurality of rollers 22 along the media path, such elements aid in moving the substrate throughout the different zones of the printer and, in particular, across the print zone. Also, the printer 1 comprises a vacuum chamber 30 associated to a vacuum pump as to exert a vacuum on the porous substrate 23 while it is substantially within the print zone as to force printing fluid ejected by the printheads 21 through the porous substrate.

In the example of FIG. 2 it should be noted that the vacuum chamber 30 spans the print zone length ($P_L$) and extends beyond such length by a tolerance factor, e.g., by 20%.

Also, the vacuum chamber 30 and its associated vacuum pump is independent from the conveying mechanism of the printer 1 therefore, the vacuum chamber 30 and its associated pump have substantially no effect on the conveying and/or fixing of the substrate to the media path. In particular, given that the substrate handled is porous and, therefore, vacuum has a negligible effect in the movement and/or positioning of the media associated to the media path.

Figures 3A, 3B, 3C:
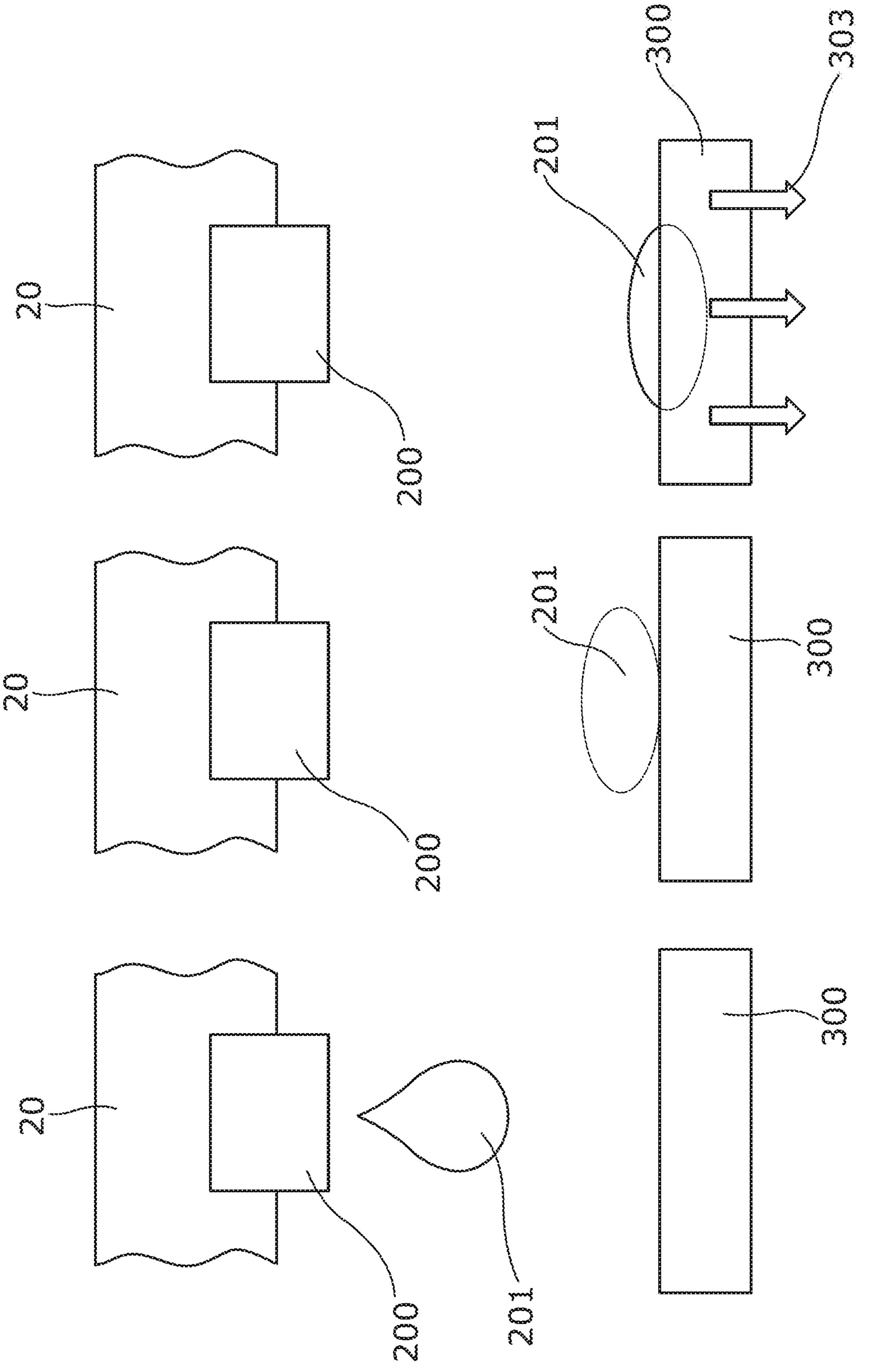
FIGS. 3A-3C show schematically the effect of vacuum in a porous substrate during a printing operation.

FIGS. 3A-3C show schematically the effect of vacuum while printing on a porous substrate 300. In a first instant illustrated by FIG. 3A a nozzle 200 associate to a printhead or printbar 20 ejects printing fluid 201 towards the substrate 300. In an example, the substrate may have been previously subject to treatments that may affect its permeability, e.g., hydrophobic treatments thereby further reducing the absorption capability of the substrate 300. Furthermore, in some examples, the printing fluid may have a viscosity that is high enough that makes it difficult to penetrate the substrate 300.

In a second instant illustrated by FIG. 3B, the printing fluid reaches the substrate 300. The printing fluid and/or the porous substrate 300 may not allow for penetration or the penetration of the printing fluid within the substrate may be less than ideal. For example, the penetration may not be enough to get an acceptable print quality on both sides of the textile or the penetration may not be enough to ensure an appropriate level of washfastness.

To address the above-mentioned scenarios, the printing system may be provided with a vacuum arrangement comprising a pump and a vacuum chamber so that, while the porous substrate 300 is still within the print zone or, at least, substantially within the print zone, vacuum 303 is activated by the controller as to enhance printing fluid penetration through the substrate 300. In an example, the vacuum exerted to the porous substrate 300 may be in a pulsed manner wherein the duty cycle of the pulses may be configurable, e.g., by pulse-width modulation (PWM) techniques. Also, in some examples, the vacuum may be set in view of parameters such as: type of substrate, type of printing fluid, printing fluid density, etc.

Figure 4A:
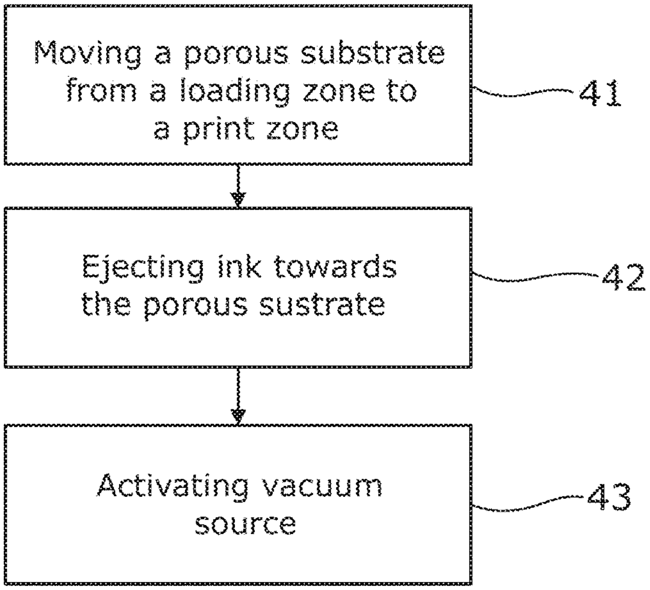
FIG. 4A shows another example method for printing a porous substrate according to an example.

FIG. 4A illustrates a method for printing a porous substrate that may be implemented in a controller. In particular, the method of FIG. 4A comprises moving a porous substrate 41. This movement of the porous substrate may be, e.g., from a loading zone to a print zone or, in more general terms, from outside the print zone towards the print zone.

Upon reaching the print zone, the substrate is printed 42 or, in more general terms, printing fluid (either marking or non-marking fluid) may be ejected by nozzles associated to the print engine towards the substrate. In an example, the printing fluid may be an ink, in other examples, the printing fluid may be a non-marking fluid such as a pre-treatment or an overcoat.

Once the substrate has been printed and, while still substantially within the print zone, a vacuum source is activated 43 as to enhance absorption of the printing fluid by the porous substrate.

Figure 4B:
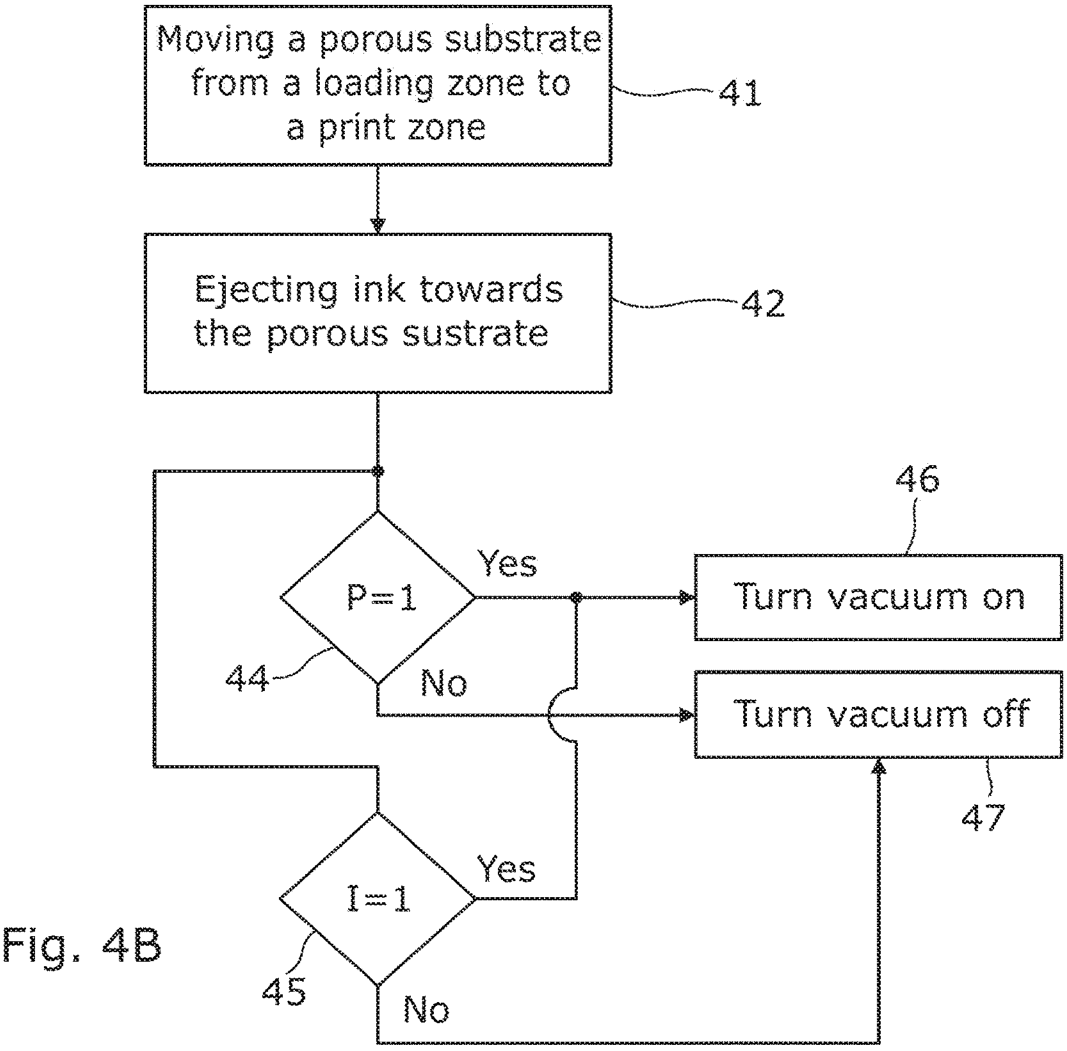
FIG. 4B shows another example method for printing a porous substrate according to another example.

FIG. 4B shows a further method wherein, once the substrate has been printed the controller may determine whether a porous substrate is positioned on the print zone 44, if it is (P=1) then the controller turns the vacuum on 46 as to enhance the absorption by the porous substrate, otherwise the vacuum is turned off 47. In an example, the use of vacuum helps penetrate faster through the porous substrate.

In addition or instead of block 44, the controller may determine if a print operation is currently being performed 45, if it is (I=1), then the controller turns the vacuum on 46 as to enhance the absorption by the porous substrate, otherwise the vacuum is turned off 47.

In an example, the conveyor may also move the porous substrate towards a post-processing zone once the porous substrate has been printed. In this post-processing zone, the porous substrate may be treated in order to obtain a finished porous substrate. Examples of these treatments may be, e.g., application of an overcoat, application of other types of non-marking fluids to protect the printing fluids, heating by means of an impinging mechanism, heating by means of light generations (for example, narrow band LED, UV LED, infrared lamps, etc.) or even unloading the material.

In the above-mentioned examples, the printer may be provided with a controller and the controller may control the conveyor, the vacuum source and the print engine. The controller may be a combination of circuitry and executable instructions representing a control program to perform the above-mentioned operations.

Further, some examples of controllers may be provided into a non-transitory machine-readable storage medium encoded with instructions executable by a processing resource of a computing device to perform methods described herein.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teachings. It is to be understood that any feature described in relation to any one example may be used alone, or in combination with other features described, and may also be used in combination with any features of any other of the examples, or any combination of any other of the examples.

The invention claimed is:

1. A method to print on porous substrate by a printer comprising:

receiving, via a conveyor, a porous substrate on a loading zone and to move the porous substrate along a transport direction between a print zone and the loading zone;

ejecting, via a print engine positioned on the print zone, printing fluid towards a front side the porous substrate; and activating, via a controller, a vacuum source as to exert a vacuum on a back side of the porous substrate being the vacuum exerted while the porous substrate is within the print zone, wherein the controller activates the vacuum source using pulse-width modulation.

2. The method of claim 1 wherein the conveyor is independent from the vacuum source.

3. The method of claim 1 wherein the conveyor comprises a tray to reciprocate along the transport direction with the porous substrate fixed to the tray.

4. The method of claim 3, wherein the tray comprises a fluid conduct as to allow vacuum to pass through the tray towards the porous substrate.

5. The method of claim 3, wherein the tray comprises a clamping mechanism to fix the porous substrate to the tray.

6. The method of claim 1 wherein the vacuum source is activated by the controller.

7. The method of claim 1 wherein the controller deactivates the vacuum source if: the porous substrate is substantially away from the print zone and/or printing fluid is not being ejected towards the porous substrate.

8. The method of claim 1 wherein the printer comprises a page-wide array of nozzles to eject the printing fluid towards the porous substrate.

9. A porous substrate printer that comprises a plurality of nozzles to eject printing fluid along the width of print zone;

a conveyor to move a porous substrate below the nozzles in a transport direction perpendicular to the width of the print zone, wherein the conveyor comprises a tray to reciprocate along the transport direction with the porous substrate fixed to the tray during a printing operation, wherein the tray comprises a fluid conduct as to allow vacuum to pass through the tray towards the porous substrate; and a vacuum source associated to a controller and being to exert a vacuum below the substrate in an area spanning the print zone;

wherein during a printing operation, the controller is to activate the vacuum source thereby increasing the absorption of the printing fluid by the porous substrate.

10. The printer of claim 9 wherein the printer comprises a filter between the vacuum source and the substrate.

11. The printer of claim 10, wherein the filter comprises a foam.

12. The printer of claim 9 wherein the length of the print zone is, at most, half of the width of the print zone.

13. At least one non-transitory computer readable storage medium comprising a set of executable instructions, which when executed by a computing system, cause the computing system to:

receive, via a conveyor, a porous substrate on a loading zone and to move the porous substrate along a transport direction between a print zone and the loading zone;

eject, via a print engine positioned on the print zone, printing fluid towards a front side the porous substrate; and activate, via a controller, a vacuum source as to exert a vacuum on a back side of the porous substrate being the vacuum exerted while the porous substrate is within the print zone, wherein the controller deactivates the vacuum source if: the porous substrate is substantially away from the print zone and/or printing fluid is not being ejected towards the porous substrate.

* * * * *